United States Patent [19]

Kimura

[11] Patent Number: 4,786,807
[45] Date of Patent: * Nov. 22, 1988

[54] RADIATION IMAGE READ-OUT APPARATUS

[75] Inventor: Tsutomu Kimura, Kanagawa, Japan

[73] Assignee: Fuji Photo Film Co., Ltd., Kanagawa, Japan

[*] Notice: The portion of the term of this patent subsequent to Feb. 2, 2005 has been disclaimed.

[21] Appl. No.: 26,712

[22] Filed: Mar. 17, 1987

[30] Foreign Application Priority Data

Mar. 17, 1986 [JP] Japan .................................. 61-58804

[51] Int. Cl.⁴ ............................................. G01T 1/105
[52] U.S. Cl. ................................... 250/327.2; 414/283
[58] Field of Search ........................ 250/327.2, 484.1; 271/268, 298; 414/277, 280, 281, 282, 283, 331, 618, 622, 751, 753

[56] References Cited

U.S. PATENT DOCUMENTS

| | | | |
|---|---|---|---|
| 4,258,264 | 3/1981 | Kotera et al. | 250/484.1 |
| 4,276,473 | 6/1981 | Kato et al. | 250/327.2 |
| 4,315,318 | 2/1982 | Kato et al. | 364/515 |
| 4,387,428 | 6/1983 | Ishida et al. | 364/414 |
| 4,400,619 | 8/1983 | Kotera et al. | 250/327.2 |
| 4,578,582 | 3/1986 | Takano | 250/327.2 |
| 4,723,074 | 2/1988 | Kimura | 250/327.2 |

Primary Examiner—Janice A. Howell
Assistant Examiner—Constantine Hannaher
Attorney, Agent, or Firm—Sughrue, Mion, Zinn, Macpeak and Seas

[57] ABSTRACT

A radiation image read-out apparatus comprises a sheet receiving section for receiving a stimulable phosphor sheet carrying a radiation image stored thereon, a sheet storing section for storing a plurality of stimulable phosphor sheets, and an image read-out section provided with a stimulating ray source for emitting stimulating rays for scanning the stimulable phosphor sheet carrying the radiation image stored thereon, and a photodetector for detecting light emitted by the stimulable phosphor sheet scanned with stimulating rays to obtain an electric image signal. The apparatus also comprises an erasing section for having the stimulable phosphor sheet release radiation energy remaining thereon after image read-out is conducted, and a sheet conveyance system provided with a sheet holding mechanism for holding the stimulable phosphor sheet transferably with respect to the sheet receiving section, the sheet storing section, the image read-out section, and the erasing section. The sheet conveyance system moves the sheet holding mechanism in a arbitrary order among the sections.

7 Claims, 2 Drawing Sheets

RADIATION IMAGE READ-OUT APPARATUS

BACKGROUND OF THE INVENTION

1. Field of the Invention

This invention relates to a radiation image read-out apparatus for exposing stimulable phosphor sheets carrying a radiation image stored thereon respectively to stimulating rays which cause them to emit light in proportion to the stored radiation energy, and detecting and converting the emitted light into electric signals. This invention particularly relates to a radiation image read-out apparatus in which a plurality of the stimulable phosphor sheets are subjected to image read-out in an arbitrary order.

1. Description of the Prior Art

When certain kinds of phosphors are exposed to a radiation such as X-rays, α-rays, β-rays, γ-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. Nos. 4,258,264, 4,276,473, 4,315,318 and 4,387,428 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet) is first exposed to a radiation passing through an object such as the human body to have a radiation image of the object stored thereon, and is then scanned with stimulating rays which cause it to emit light in proportion to the stored radiation energy. The light emitted by the stimulable phosphor sheet upon stimulation thereof is photoelectrically detected and converted to an electric image signal, which is processed as desired to reproduce a visible image having an improved quality, particularly a high diagnostic efficiency and accuracy. The finally obtained visible image may be reproduced in the form of a hard copy or may be displayed on a cathode ray tube (CRT). In this radiation image recording and reproducing system, the stimulable phosphor sheet is used to temporarily store the radiation image in order to reproduce the final visible image therefrom on a final recording medium. For economical reasons, therefore, it is desirable that the stimulable phosphor sheet be used repeatedly.

In order to reuse stimulable phosphor sheets as described above, the radiation energy remaining on the stimulable phosphor sheet after it is scanned with stimulating rays to read out the radiation image stored thereon should be released by exposure to light or heat as described in, for example, Japanese Unexamined Patent Publication No. 56(1981)-12599 or U.S. Pat. No. 4,400,619. The stimulable phosphor sheet should then be used again for radiation image recording. Accordingly, the applicant proposed in, for example, Japanese Patent Application No. 59(1984)-220740 a radiation image read-out apparatus which conducts image read-out from a stimulable phosphor sheet and erasing of residual radiation energy as mentioned above.

In the case where image read-out is conducted by use of the radiation image read-out apparatus provided with an image read-out section and an erasing section as mentioned above, for example, when it is found that radiation image recording conducted on a stimulable phosphor sheet was incorrect after the stimulable phosphor sheet is fed to the radiation image read-out apparatus, it is desired to send the stimulable phosphor sheet directly to the erasing section without conducting image read-out to erase the stored radiation energy, thereby more quickly making the sheet reusable for image recording. Also, when in the radiation image read-out apparatus there are stimulable phosphor sheets carrying a radiation image stored thereon on which image read-out has not been carried out, it is often desired to conduct urgent image read-out on a different stimulable phosphor sheet preferentially to the aforesaid stimulable phosphor sheets and quickly observe the radiation image stored on the stimulable phosphor sheet.

However, in the conventional radiation image read-out apparatus provided with the image read-out section and the erasing section, the image read-out section and the erasing section are connected by, for example, an endless belt device, and the stimulable phosphor sheet must always be passed through the image read-out section when it is sent to the erasing section. Therefore, a long time is required for the sending operation, and the waiting time until the next image read-out becomes long.

In order to make the aforesaid preferential image read-out possible, it has been proposed in, for example, Japanese Unexamined Patent Publication No. 58(1983)-72044, to dispose a stack zone and a by-pass feed system for changing the order of the sheet feed to the image read-out section between a stimulable phosphor sheet receiving section and the image read-out section. In this case, since the stimulable phosphor sheet is passed through a complicated sheet feed system composed of endless belts, nip rollers or the like, the sheet is easily scratched or dust readily clings to the sheet because of electrostatic attraction.

SUMMARY OF THE INVENTION

The primary object of the present invention is to provide a radiation image read-out apparatus which is free from the drawbacks of the conventional radiation image read-out apparatus and wherein a plurality of stimulable phosphor sheets fed to the apparatus are subjected to image read-out in an arbitrary order.

Another object of the present invention is to provide a radiation image read-out apparatus wherein a stimulable phosphor sheet may be directly sent to an erasing section without passing through an image read-out section.

The present invention provides a radiation image read-out apparatus comprising:

(i) a sheet receiving section for receiving a stimulable phosphor sheet carrying a radiation image stored thereon, (ii) a sheet storing section for storing a plurality of the stimulable phosphor sheets, (iii) an image read-out section provided with a stimulating ray source for emitting stimulating rays for scanning said stimulable phosphor sheet carrying said radiation image stored thereon, and a photoelectric read-out means for detecting light emitted by said stimulable phosphor sheet scanned with said stimulating rays to obtain an electric image signal, (iv) an erasing section for having said stimulable phosphor sheet release the radiation energy remaining thereon after image read-out is conducted on said stimulable phosphor sheet at said image read-out section, and (v) a sheet conveyance means provided with a sheet holding mechanism for holding said stimulable phosphor sheet transferably with respect to said sheet receiving section, said sheet storing section, said image read-out section, and said erasing section, said sheet conveyance means moving said sheet holding mechanism in an arbitrary order among said sections.

In the radiation image read-out apparatus of the present invention, the stimulable phosphor sheet is conveyed by the sheet conveyance means which moves the sheet holding mechanism for holding the stimulable phosphor sheet in an arbitrary order among the sheet receiving section, the sheet storing section, the image read-out section and the erasing section. Therefore, it is possible to convey the stimulable phosphor sheet without passing through an unnecessary section or sections among said sections, and to increase the image read-out and erasing processing speed. Also, since the stimulable phosphor sheet is held by the sheet holding mechanism of the sheet conveyance means and conveyed in this condition, there is no risk of the stimulable phosphor sheet being scratched or giving rise to static electricity in the course of sheet conveyance, and the service life of the sheet becomes longer than with an apparatus wherein the sheet is conveyed by belt conveyors, conveyor rollers or the like connecting the aforesaid sections.

DESCRIPTION OF THE PREFERRED EMBODIMENTS

The present invention will hereinbelow be described in further detail with reference to the accompanying drawings.

Figure 1:
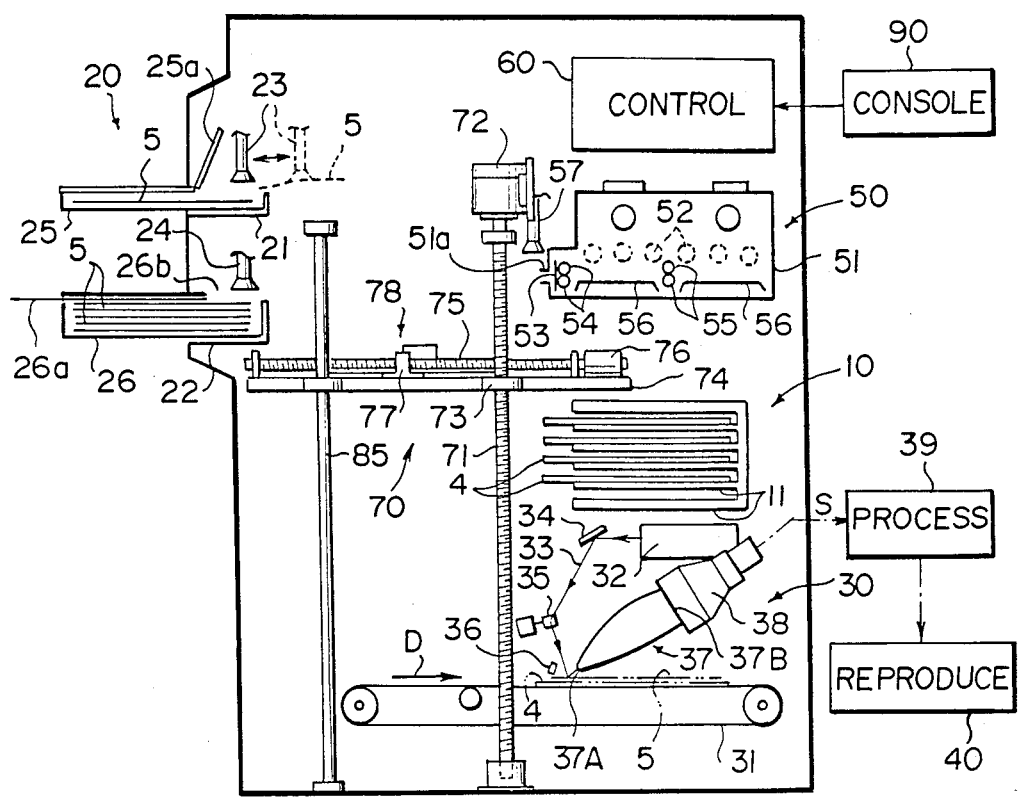
FIG. 1 is a schematic side view showing an embodiment of the radiation image read-out apparatus in accordance with the present invention.

Referring to FIG. 1, an embodiment of the radiation image read-out apparatus in accordance with the present invention comprises a sheet storing section 10, a sheet receiving section 20, an image read-out section 30, an erasing section 50, a control section 60, and a sheet conveyance means 70.

Figure 2:
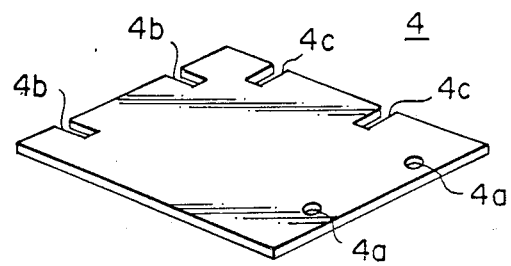
FIG. 2 is a perspective view showing the sheet base used in the embodiment of FIG. 1, and FIGS. 3 and 4 are perspective views showing a part of the embodiment of FIG. 1.

The sheet storing section 10 is provided with a plurality of horizontal rack plates 11, 11, . . . (by way of example, five rack plates in this embodiment). Stimulable phosphor sheets 5, 5, . . . are detachably mounted on the rack plates 11, 11, . . . respectively via sheet bases 4, 4, . . . as described later. The sheet bases 4, 4, . . . are formed of a substantially rigid material. As shown in FIG. 2, each of the sheet bases 4, 4, . . . is provided with clamp holes 4a, 4a at one end portion, slits 4b, 4b at the other end portion opposite to said one end portion, and slits 4c, 4c at an end portion adjacent to said other end portion. The sheet base 4 is detachably mounted on the rack plate 11 so that said one end portion provided with the clamp holes 4a, 4a is positioned on the forward side as viewed in the direction normal to the drawing sheet in FIG. 1 and projected slightly outwardly of the rack plate 11.

The sheet receiving section 20 is provided with a cassette receiving member 21 and a magazine receiving member 22, and air suction arms 23 and 24 for sucking the stimulable phosphor sheet 5 and for vertical and horizontal movements are disposed respectively in the vicinity of the cassette receiving member 21 and the magazine receiving member 22. A cassette 25 housing a single stimulable phosphor sheet 5 carrying a radiation image stored thereon and having a cover member 25a closed is fed to the cassette receiving member 21. After the cassette 25 is fed to the cassette receiving member 21, the cover member 25a is opened by a cover opening mechanism (not shown). On the other hand, a magazine 26 housing a plurality of the stimulable phosphor sheets carrying a radiation image stored thereon and having a shutter 26a closed is fed to the magazine receiving member 22. After the magazine 26 is fed to the magazine receiving member 22, a sheet outlet 26b is opened by the pulling out of the shutter 26a.

The image read-out section 30 is provided with an endless belt 31 disposed at the lower section for conveying the stimulable phosphor sheet 5 in the direction as indicated by the arrow D in FIG. 1 up to a predetermined read-out position, i.e. the main scanning position of a laser beam as described later, and moving the stimulable phosphor sheet 5 at a predetermined speed in a sub-scanning direction as indicated by the arrow D approximately normal to the main scanning direction of the laser beam at the read-out position. Above the endless belt 31 are disposed a laser beam source 32, and a mirror 34 and a galvanometer mirror 35 for scanning a laser beam 33 emitted by the laser beam source 32 in the width direction of the stimulable phosphor sheet 5 on the endless belt 31. A light guiding reflection mirror 36 and a light guide member 37 are disposed to extend along the main scanning line at the scanning position of the laser beam 33 on the stimulable phosphor sheet 5. The light guide member 37 has a light output face 37B closely contacted with a photomultiplier 38. An output S of the photomultiplier 38 is sent to an image processing circuit 39.

The erasing section 50 is constituted by a case 51 fabricated of a light shielding material and having a slit-like opening 51a disposed at a part of the case 51 (i.e. at the left lower section in FIG. 1) for introduction and removal of the stimulable phosphor sheet 5 from the case 51. The erasing section 50 also comprises a plurality of erasing light sources 52, 52, . . . constituted by fluorescent lamps, halogen lamps, tungsten-filament lamps, xenon lamps or the like disposed inside of the case 51 for emitting mainly light having a wavelength within the stimulation wavelength range for the stimulable phosphor constituting the stimulable phosphor sheet 5. Further, the erasing section 50 is provided with a shutter 53 disposed to face the opening 51a for opening and closing it, a pair of nip rollers 54, 54, a pair of nip rollers 55, 55, and guide plates 56, 56 for conveying the stimulable phosphor sheet 5 inserted through the opening 51a into the case 51.

Figure 3:
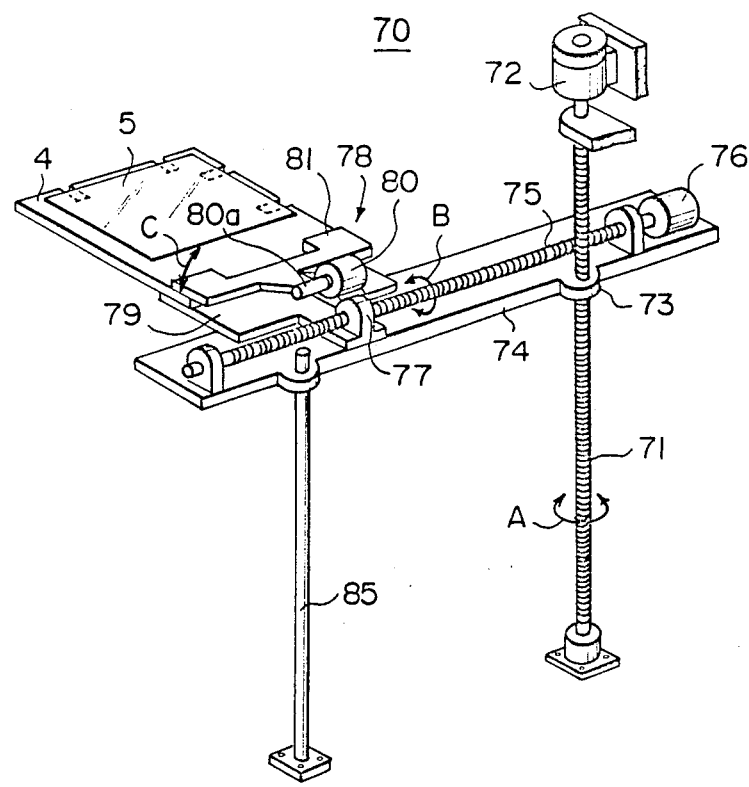

As shown in detail in FIG. 3, the sheet conveyance means 70 comprises a screw rod 71 disposed vertically for rotation around the longitudinal axis, i.e. in the direction as indicated by the arrow A, a motor 72 for rotating the screw rod 71, and a vertically moveable base 74 having a nut section 73 meshed with the screw rod 71 and moveable along the screw rod 71 and a guide rod 85. The sheet conveyance means 70 also comprises a screw rod 75 horizontally placed on the vertically moveable base 74 and supported rotatably around the longitudinal axis, i.e. in the direction as indicated by the arrow B, a motor 76 for rotating the screw rod 75, and a sheet holding mechanism 78 having a nut section 77 meshed with the screw rod 75. The screw rod 71 is disposed on the lateral side with respect to the sheet storing section 10, the sheet receiving section 20, the image read-out section 30 and the erasing section 50, i.e. on the forward side as viewed in the direction normal to the drawing sheet in FIG. 1. Therefore, when the motor 72 is driven to rotate the screw rod 71, the vertically moveable base 74 moves vertically on the lateral side with respect to the aforesaid sections 10, 20, 30 and 50. Also, when the motor 76 is driven and the screw rod 75 is rotated, the sheet holding mechanism 78 moves horizontally. The sheet holding mechanism 78 comprises a base plate 79 secured to the nut section 77, a rotary solenoid 80 mounted on the base plate 79, and a holding plate 81 secured to a rotation shaft 80a of the rotary solenoid 80 for swinging on the base plate 79 in the direction as indicated by the arrow C in FIG. 3.

The control section 60 receives inputs from a group of sensors (not shown) and an instruction specified from a console 90 or the like, and controls the operations of the air suction arms 23 and 24 at the sheet receiving section 20, the endless belt 31, the laser beam source 32, and the galvanometer mirror 35 at the image read-out section 30, the erasing light sources 52, 52, . . . , the shutter 53, the nip rollers 54, 54 and the nip rollers 55, 55 at the erasing section 50, and the motors 72, 76 and the rotary solenoid 80 of the sheet conveyance means 70. The console 90 is provided with switches for carrying out the ordinary radiation image read-out, and manual conveyance switches indicated, for example, as "storing section", "receiving section", "read-out section", and "erasing section" for manually conveying the stimulable phosphor sheet 5 to the sheet storing section 10, the sheet receiving section 20, the image read-out section 30, and the erasing section 50.

The operations of the aforesaid embodiment will be described hereinbelow. First, when radiation image read-out is to be conducted ordinarily, the motor 72 is rotated by a predetermined amount by the instruction specified by, for example, the console 90 connected to the control section 60, and the vertically moveable base 74 is moved to a predetermined vertical position on the lateral side with respect to the sheet storing section 10. Then, the motor 76 is rotated by a predetermined amount, and the sheet holding mechanism 78 is moved rightwardly from the waiting position spaced leftwardly from the sheet storing section 10 in FIG. 1 until the base plate 79 comes to a position under the portion of the predetermined sheet base 4 protruded from the rack 11, i.e. the end portion of the sheet base 4 provided with the clamp holes 4a, 4a as shown in FIG. 2. (At this time, the holding plate 81 is positioned so that its leading end is upwardly spaced from the base plate 79.) Thereafter, the rotary solenoid 80 is activated to swing the holding plate 81 so that its leading end moves toward the base plate 79. As a result, the end portion of the sheet base 4 is grasped between the holding plate 81 and the base plate 79. In this condition, the motor 76 is rotated reversely to move the sheet holding mechanism 78 leftwardly in FIG. 1, and the grasped sheet base 4 is taken out of the sheet storing section 10. The lower surface of the holding plate 81 is provided with clamp protrusions (not shown) for fitting into the clamp holes 4a, 4a of the sheet base 4 so that sheet base 4 is firmly held by the holding plate 81. After the sheet base 4 is completely removed from the sheet storing section 10 and moved leftwardly in FIG. 1 up to a predetermined position, the motor 76 is stopped. The motor 72 is then operated to move the sheet holding mechanism 78 up. The motor 72 is stopped when the sheet base 4 held by the sheet holding mechanism 78 is positioned on the lateral side (right side in FIG. 1) of the cassette 25 or the magazine 26 fed to the sheet receiving section 20. In this case, the instruction for specifying whether to conduct image read-out from the stimulable phosphor sheet 5 housed in the cassette 5 or to conduct image read-out from the stimulable phosphor sheet 5 housed in the magazine 26 is given to the control section 60 via the console 90 or the like. Based on the instruction, the control sectin 60 stops the motor 72 when the sheet base 4 is positioned on the lateral side of the cassette 25 or on the lateral side of the magazine 26.

Figure 4:
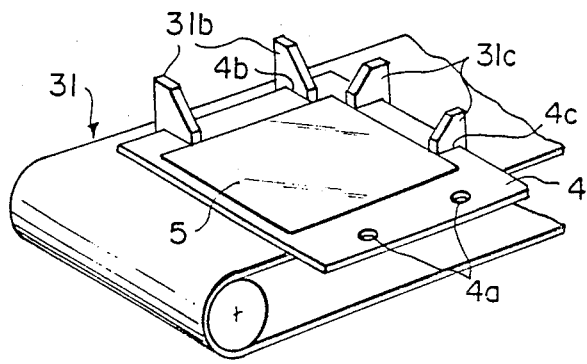

After the sheet holding mechanism 78 is stopped as mentioned above, the air suction arm 23 or the air suction arm 24 is activated to take a single stimulable phosphor sheet 5 out of the cassette 25 or the magazine 26. The stimulable phosphor sheet 5 is transferred onto the sheet base 4 by the movement of the air suction arm 23 or 24. Then, the motor 72 is operated to move the sheet holding mechanism 78 down, and is stopped when the sheet base 4 arrives at the endless belt 31. The rotary solenoid 80 is then activated to swing the holding plate 81 so that its leading end moves away from the base plate 79 to release grasping of the sheet base 4. In this manner, the sheet base 4 is transferred from the sheet holding mechanism 78 onto the endless belt 31. As shown in FIG. 4, a pair of sheet position adjusting guides 31b, 31b and a pair of sheet position adjusting guides 31c, 31c are protruded from the endless belt 31 for advancing into the slits 4b, 4b and the slits 4c, 4c of the sheet base 4 when the sheet base 4 is fed onto the endless belt 31, pushing the end portions of the stimulable phosphor sheet 5, and moving the stimulable phosphor sheet 5 to a predetermined position on the endless belt 31. In the case where stimulable phosphor sheets 5, 5, . . . having different sizes are to be processed, the sheet position adjusting guides 31b, 31b and the sheet position adjusting guides 31c, 31c should be constituted moveably on the endless belt 31 in accordance with the sheet size to accurately adjust the position of the stimulable phosphor sheet 5 having a different size on the endless belt 31.

After the sheet base 4 and the stimulable phosphor sheet 5 are detachably mounted on the endless belt 31, the endless belt 31 is operated to convey the stimulable phosphor sheet 5 up to the main scanning position of the laser beam 33. Then, the laser beam (stimulating rays) 33 deflected by the galvanometer mirror 35 scans the stimulable phosphor sheet 5 in the main scanning direction. When the stimulable phosphor sheet 5 is exposed to the laser beam 33, the exposed portion of the sheet 5 emits light in proportion to the stored radiation energy. The light emitted by the stimulable phosphor sheet 5 directly towards the light guide member 37 and the light emitted by the sheet 5 and reflected by the light guiding reflection mirror 36 enter the light guide member 37 from its light input face 37A, are guided inside of the light guide member 37 through total reflection, and are detected by the photomultiplier 38 closely contacted with the light output face 37B of the light guide member 37. Thus the light emitted by the stimulable phosphor sheet 5 is photoelectrically detected by the photomultiplier 38. Simultaneously with the scanning with the laser beam 33 in the main scanning direction, the stimulable phosphor sheet 5 is moved in the sub-scanning direction. Therefore, the radiation image stored on the stimulable phosphor sheet 5 is read out over the whole surface thereof. The output signal (read-out image signal) S generated by the photomultiplier 38 and representing the radiation image stored on the stimulable phosphor sheet 5 is sent to the image processing circuit 39 for conducting necessary image processing, and then sent to an image reproducing apparatus 40. The image reproducing apparatus 40 may be a display device such as a cathode ray tube (CRT), or an apparatus for recording the image on a photographic film by scanning with light, or may be replaced by an apparatus for storing the electric image signal on a storage medium such as a magnetic tape.

After the image read-out is finished as mentioned above, the endless belt 31 is rotated reversely to return the stimulable phosphor sheet 5 to the position at which the sheet 5 was transferred from the sheet holding mechanism 78 onto the endless belt 31, and is then stopped. After the endless belt 31 is stopped, the rotary solenoid 80 is activated to move the leading end of the holding plate 81 toward the base plate 79, and the end portion of the sheet base 4 protruded from the endless belt 31 is grasped between the holding plate 81 and the base plate 79.

In the case where an instruction for the next radiation image read-out is given by the console 90 or the like after the first stimulable phosphor sheet 5 is transferred onto the endless belt 31 at the image read-out section 30, the sheet holding mechanism 78 is returned to the sheet storing section 10, a second sheet base 4 is sent to the sheet receiving section 20 in the same manner as mentioned above, and a second stimulable phosphor sheet 5 carrying a radiation image stored thereon is fed onto the sheet base 4. Then, the second stimulable phosphor sheet 5 is stored at the sheet storing section 10 in the same manner as the sheet storing operation in the sheet storing section 10 as described later, and made to wait for completion of the image read-out from the first stimulable phosphor sheet 5. Therefore, in this case, the sheet holding mechanism 78 is returned from the sheet storing section 10 to the image read-out section 30 for holding the first stimulable phosphor sheet 5 for which the image read-out has been finished, and holds the end portion of the sheet base 4 on the endless belt 31 between the holding plate 81 and the base plate 79.

After the stimulable phosphor sheet 5 is held by the sheet holding mechanism 78 as mentioned above, the motor 72 is operated to move up the vertically moveable base 74 and the sheet holding mechanism 78. The motor 72 is stopped when the stimulable phosphor sheet 5 on the sheet base 4 held by the sheet holding mechanism 78 is moved up to the predetermined height facing the opening 51a of the erasing section 50. At this time, the shutter 53 is opened, and the motor 76 is operated to move the sheet holding mechanism 78 rightwardly in FIG. 1. The motor 76 is stopped when the sheet base 4 held by the sheet holding mechanism 78 comes close to the case 51. An air suction arm 57 disposed in the vicinity of the case 51 is activated, and the stimulable phosphor sheet 5 is moved from the sheet base 4 toward the case 51. In this manner, the end portion of the stimulable phosphor sheet 5 is inserted between the nip rollers 54, 54 via the opening 51a. Then, the nip rollers 54, 54 and the nip rollers 55, 55 are rotated to convey the stimulable phosphor sheet 5 into the case 51. When the stimulable phosphor sheet 5 has been conveyed into the case 51, the nip rollers 54, 54 and the nip rollers 55, 55 are stopped, and the shutter 53 is closed. Thereafter, the erasing light sources 52, 52, . . . in the case 51 are turned on to release radiation energy remaining on the stimulable phosphor sheet 5. At this time, since the shutter 53 is closed, there is no risk of the erasing light leaking from the case 51 to the image read-out section 30 and causing noise in the read-out signal S.

After the residual radiation energy (residual image) on the stimulable phosphor sheet 5 is erased to such an extent that the sheet 5 may be reused for radiation image recording, the erasing light sources 52, 52, . . . are turned off, and the shutter 53 is opened. The nip rollers 54, 54 and the nip rollers 55, 55 are rotated reversely, and the air suction arm 57 is operated to feed the stimulable phosphor sheet 5 from the case 51 onto the sheet base 4. In the case where the instruction for the next radiation image read-out was given after the first stimulable phosphor sheet 5 was sent to the image read-out section 30 and the second stimulable phosphor sheet 5 carrying the radiation image stored thereon was received from the sheet receiving section 20 and made to wait at the sheet storing section 10, the second sheet 5 is conveyed to the image read-out section 30 and image read-out is conducted on the second sheet in the same manner as mentioned above while erasing for the first sheet 5 is being conducted at the erasing section 50. Therefore, in this case, the sheet holding mechanism 78 moves from the erasing section 50 to the sheet storing section 10, grasps the second sheet 5 waiting at the sheet storing section 10, transfers the second sheet 5 onto the endless belt 31 at the image read-out section 30, and then returns to the erasing section 50.

In the case where the first stimulable phosphor sheet 5 is the one taken out of the cassette 25, the motors 72 and 76 are rotated when the sheet 5 is removed from the erasing section 50, and the vertically moveable base 74 is moved until the sheet base 4 held by the sheet holding mechanism 78 is positioned in the vicinity of the cassette 25 at the sheet receiving section 20. In this condition, the air suction arm 23 is operated to suck up the stimulable phosphor sheet 5 and moved reversely to the case of sheet storing, thereby returning the sheet 5 into the cassette 25. On the other hand, in the case where the first stimulable phosphor sheet 5 is the one fed out of the magazine 26, the sheet holding mechanism 78 is moved until the sheet base 4 is positioned slightly above a predetermined rack plate 11 on the left side thereof in FIG. 1, and then moved rightwardly by the rotation of the motor 76. As a result, the sheet base 4 is positioned on the predetermined rack plate 11. At this time, the rotary solenoid 80 is operated to swing the holding plate 81 in the direction releasing the holding of the sheet base 4. The sheet holding mechanism 78 is slightly moved down and then moved leftwardly. As a result, the sheet base 4 on which the stimulable phosphor sheet 5 is placed is transferred onto the predetermined rack plate 11. The aforesaid sheet conveyance from the erasing section 50 to the sheet storing section 10 is repeated, and all of the stimulable phosphor sheets 5, 5, . . . other than the last sheet 5 fed out of the magazine 26 are detachably mounted together with the sheet bases 4, 4, . . . on the rack plates 11, 11, . . . at the sheet storing section 10. When the last stimulable phosphor sheet 5 is removed from the erasing section 50, the sheet holding mechanism 78 is moved until the sheet base 4 is positioned in the vicinity of the magazine 26, and stopped. Then, the air suction arm 24 is operated in the same manner as the air suction arm 23, and the last stimulable phosphor sheet 5 is returned from the sheet base 4 into the magazine 26. The sheet holding mechanism 78 is then returned to the position for holding the sheet base 4 housed in the sheet storing section 10, and the rotary solenoid 80 is activated to hold a single predetermined sheet base 4 by the sheet holding mechanism 78. Thereafter, the sheet holding mechanism 78 is moved in the same manner as mentioned above until the sheet base 4 is positioned in the vicinity of the magazine 26, and the stimulable phosphor sheet 5 on the sheet base 4 is returned into the magazine 26 in the same manner as mentioned above. The aforesaid sheet conveyance from the sheet storing section 10 to the magazine 26 is repeated, and all of the stimulable phosphor sheets 5, 5, . . . which were fed out of the magazine 26 into the apparatus are returned to the magazine 26.

In the aforesaid embodiment, the stimulable phosphor sheet 5 fed out of the cassette 25 is returned thereto directly from the erasing section 50. However, it is also possible to store the stimulable phosphor sheets 5, 5, . . . fed out of a plurality of the cassettes 25, 25, . . . in the sheet storing section 10 after erasing is finished at the erasing section 50, and to continuously return the sheets 5, 5, . . . from the sheet storing section 10 into the cassettes 25, 25, . . . In this case, the cassette 25 fed to the sheet receiving section 20 may be exchanged with a new empty one each time the stimulable phosphor sheet 5 is returned to the cassette 25. Also, besides the sheet storing section 10, many sheet receiving trays may be disposed in the apparatus, and all of the stimulable phosphor sheets 5, 5, . . . erased at the erasing section 50 may be sequentially housed in the trays. In this case, after the image read-out is finished for several stimulable phosphor sheets 5, 5, . . . , the trays may be taken out of the apparatus, and the sheets 5, 5, . . . may be removed from the trays.

The aforesaid embodiment is operated as mentioned above in the case where the stimulable phosphor sheet 5 is conveyed in the normal sequence of the sheet receiving section 20 →(the sheet storing section 10 →) the image read-out section 30 →the erasing section 50 →(the sheet storing section 10 →) the sheet receiving section 20. However, the sheet holding mechanism 78 for holding the stimulable phosphor sheet 5 is moveable in any other sequence among the sections 10, 20, 30 and 50. For this purpose, a signal specifying the movement destination of the sheet holding mechanism 78, i.e. the section 10, 20, 30 or 50, is entered from the console 90 or the like to the control section 60 by depressing of the switch among the manual conveyance switches indicated as "storing section", "receiving section", "read-out section", and "erasing section" and provided on the console 90.

For example, in the case where a plurality of the stimulable phosphor sheets 5, 5, . . . are fed sequentially from the magazine 26 to the sheet storing section 10 in the normal sequence and made to wait for image read-out and it is found that radiation image recording conducted on the sheets 5, 5, . . . was incorrect, the manual conveyance switches indicated as "storing section" and "erasing section" are depressed in this order. As a result, the control section 60 controls the operations of the motors 72 and 76 of the sheet conveyance means 70 to move the sheet holding mechanism 78 to the erasing section 50 via the sheet storing section 10. When the sheet holding mechanism 78 is moved in this manner, it takes a single sheet base 4 together with the stimulable phosphor sheet 5 out of the sheet storing section 10, and sends the sheet 5 to the erasing section 50 for conducting erasing of the sheet 5. After the erasing is finished, the stimulable phosphor sheet 5 is returned to the sheet storing section 10 and then to the magazine 26, or returned directly to the magazine 26.

Also, in the case where the stimulable phosphor sheet 5 erased at the erasing section 50 and stored at the sheet storing section 10 has not been used for long periods, the sheet 5 may store radiation energy constituting noise. Therefore, in this case, the manual conveyance switches indicated as "storing section", "erasing section" and "receiving section" are depressed in this order in the course of recovering the stimulable phosphor sheet 5. As a result, the control section 60 controls the motors 72 and 76, and the sheet holding mechanism 78 is first moved to the sheet storing section 10 for taking out a single sheet base 4 together with the stimulable phosphor sheet 5, moved to send the sheet 5 to the erasing section 50 for conducting erasing (releasing of the residual radiation energy) of the sheet 5, and then moved to return the sheet 5 to the sheet receiving section 20. When the stimulable phosphor sheet 5 subjected to the erasing, i.e. secondary erasing, in this manner is returned to the cassette 25 or the magazine 26 and used for the next radiation image recording, it is possible to obtain a reproduced visible image having a high image quality and free from noise caused by the residual radiation energy.

Also, it may be desired to urgently conduct radiation image read-out from a stimulable phosphor sheet 5 fed out of a cassette 25 after the magazine 26 has been fed to the sheet receiving section 20 and some stimulable phosphor sheets 5, 5, . . . have been sequentially sent from the magazine 26 to the sheet storing section 10 and readied for image read-out. In this case, the manual conveyance switches indicated as "read-out section", "erasing section", "receiving section" and "read-out section" are depressed in this order. As a result, the sheet holding mechanism 78 is first moved to the image read-out section 30 and waits for completion of the image read-out which is being conducted on the stimulable phosphor sheet 5 at the image read-out section 30. When the image read-out from said stimulable phosphor sheet 5 is finished, the sheet holding mechanism 78 is operated to send said stimulable phosphor sheet 5 to the erasing section 50 for conducting erasing. Then, instead of returning to the sheet storing section 10 to send the stimulable phosphor sheet 5 waiting at the sheet storing section 10 to the image read-out section 30, the sheet holding mechanism 78 is moved to the sheet receiving section 20 since the manual conveyance switches were depressed in the order as mentioned above. The sheet holding mechanism 78 takes the stimulable phosphor sheet 5 carrying a radiation image stored thereon out of the cassette 25 which is fed to the sheet receiving section 20, and sends the sheet 5 to the image read-out section 30 for conducting image read-out from the sheet 5. In this manner, it is possible to conduct image read-out from the stimulable phosphor sheet 5 fed out of the cassette 25 preferentially to the sheets 5, 5, . . . already waiting for image read-out at the sheet storing section 10 in the apparatus.

The aforesaid sequential operations specified by the manual switches on the console 90 may also be achieved automatically by programming the operations by use of a microcomputer or the like at the control section 60.

In the aforesaid embodiment, the stimulable phosphor sheet 5 is detachably mounted on the sheet base 4, the sheet base 4 is held by the sheet holding mechanism 78, and thus the sheet 5 is indirectly held by the sheet holding mechanism 78. However, the stimulable phosphor sheet 5 may also be held by other mechanisms. For example, the stimulable phosphor sheet body may be secured to a reinforcement plate, and the end portion of the reinforcement plate may be grasped by a grasping mechanism. Also, the stimulable phosphor sheet body may be sucked and held by an air suction cup. Further, the stimulable phosphor sheet 5 may be held by supporting it at, for example, four points, from below. In the case where the stimulable phosphor sheet body is directly held in this manner, in order to prevent sheet conveyance failures, the stimulable phosphor sheet should preferably be constituted by a rigid substrate and a stimulable phosphor laid on the substrate. In the case where the stimulable phosphor sheet comprising the reinforcement plate and the stimulable phosphor sheet body secured to the reinforcement plate is used as mentioned above, a detent for position adjustment may be provided at a part of the reinforcement plate, thereby improving the sheet position adjustment accuracy at the sheet storing section 10, the image read-out section 30, and the erasing section 50 by use of the detent. Also, the reinforcement plate may be provided with a bar code or the like for indicating the type of the sheet (the size, sensitivity or the like), and the bar code or the like may be used for sheet control in the apparatus.

Also, a sheet conveyance means constituted in the same manner as the sheet conveyance means 70 may be used additionally. In this case, it is possible to convey the stimulable phosphor sheet 5 more efficiently.

Further, instead of using the screw rods 71 and 75 in the sheet conveyance means 70, it is also possible to use chains, belts or the like for moving the vertically moveable base 74 and the sheet holding mechanism 78.

At the image read-out section 30, image read-out should preferably be conducted by the method as is disclosed in, for example, Japanese Unexamined Patent Publication No. 58(1983)-67240. Specifically, in the disclosed method, preliminary read-out for approximately ascertaining the image input information of a radiation image stored on a stimulable phosphor sheet is conducted by use of stimulating rays having an energy level lower than the energy level of stimulating rays used in final read-out prior to the final read-out for reproducing a visible image used for viewing, particularly for diagnostic purposes. The read-out gain in the final read-out is adjusted and/or the image processing is conducted based on the preliminary read-out information. In this case, the preliminary read-out means and the final read-out means may be disposed independently, or may be constituted by a single means. At the image read-out section 30 in the aforesaid embodiment, the preliminary read-out may be conducted by conveying the stimulable phosphor sheet 5 by the endless belt 31 in the sub-scanning direction as indicated by the arrow D, the sheet 5 is returned to the read-out position reversely to the arrow D, and the final read-out may then be conducted by conveying the sheet 5 in the sub-scanning direction as indicated by the arrow D. Or, the preliminary read-out may be conducted during sheet conveyance in the sub-scanning direction as indicated by the arrow D, and the final read-out may be conducted during sheet conveyance in the sub-scanning direction in reverse to the arrow D.

I claim:

1. A radiation image read-out apparatus comprising:
   (i) a sheet receiving section for receiving a stimulable phosphor sheet carrying a radiation image stored thereon,
   (ii) a sheet storing section for storing a plurality of the stimulable phosphor sheets,
   (iii) an image read-out section provided with a stimulating ray source for emitting stimulating rays for scanning said stimulable phosphor sheet carrying said radiation image stored thereon, and a photoelectric read-out means for detecting light emitted by said stimulable phosphor sheet scanned with said stimulating rays to obtain an electric image signal,
   (iv) an erasing section for having said stimulable phosphor sheet release the radiation energy remaining thereon after image read-out is conducted on said stimulable phosphor sheet at said image read-out section, and
   (v) a sheet conveyance means provided with a sheet holding mechanism for holding said stimulable phosphor sheet transferably with respect to said sheet receiving section, said sheet storing section, said image read-out section, and said erasing section, said sheet conveyance means moving said sheet holding mechanism in an arbitrary order among said sections.

2. An apparatus as defined in claim 1 wherein said sheet receiving section is provided with a cassette receiving member for receiving a cassette housing a single stimulable phosphor sheet and a magazine receiving member for receiving a magazine housing a plurality of stimulable phosphor sheets.

3. An apparatus as defined in claim 1 wherein said sheet storing section comprises a plurality of rack plates for respectively supporting said stimulable phosphor sheets thereon.

4. An apparatus as defined in claim 1 wherein said sheet conveyance means comprises a vertical screw rod, a motor for rotating said vertical screw rod, a vertically moveable base having a nut section meshed with said vertical screw rod, a horizontal screw rotatably supported on said vertically moveable base, a motor for rotating said horizontal screw rod, and said sheet holding mechanism having a nut section meshed with said horizontal screw rod.

5. An apparatus as defined in claim 4 wherein said vertical screw rod is disposed on the lateral side with respect to said sheet receiving section, said sheet storing section, said image read-out section, and said erasing section.

6. An apparatus as defined in claim 4 wherein said sheet holding mechanism comprises a base plate secured to said nut section of said sheet holding mechanism, a rotary solenoid mounted on said base plate, and a holding plate secured to a rotation shaft of said rotary solenoid for swinging on said base plate toward and away from said base plate.

7. An apparatus as defined in claim 1 wherein said sheet holding mechanism is constituted to hold a sheet base on which said stimulable phosphor sheet is detachably mounted, so as to indirectly hold said stimulable phosphor sheet.

* * * * *